United States Patent [19]

Billin

[11] 3,761,769
[45] Sept. 25, 1973

[54] SAFETY DEVICES FOR ELECTRICAL APPARATUS OF MEDICAL AND OTHER TYPES

[75] Inventor: Arthur Gilbert Billin, Penfield, N.Y.

[73] Assignee: Sybron Corporation, Rochester, N.Y.

[22] Filed: Sept. 10, 1972

[21] Appl. No.: 279,447

[52] U.S. Cl. ............... 317/18 D, 317/27 R, 317/31, 317/33 SC, 317/46, 307/127
[51] Int. Cl. ............................................. H02h 3/28
[58] Field of Search ................. 317/18 D, 27 R, 31, 317/33 SC, 46, 48, 54; 127/2.06 R; 307/127

[56] References Cited
UNITED STATES PATENTS
3,628,094  12/1971  Billin................................... 317/31

Primary Examiner—J. D. Miller
Assistant Examiner—Harvey Fendelman
Attorney—Theodore Roessel

[57] ABSTRACT

Medical, dental or other apparatus contacting living beings is connected to its source of electrical energy by a safety device which, upon connection to the source, prevents energization of the apparatus if, when the connection is made, faults such as transposed connections, and/or discontinuity in the connections, exist. The safety device includes a differential transformer having a center-tapped primary connected to the hot, neutral, and ground wires of the apparatus, and a normally-closed switch controlling the continuity of the wires. Fault causes the transformer's secondary to produce a voltage, which is used to fire an SCR, which opens the switch.

5 Claims, 2 Drawing Figures

FIG. 1
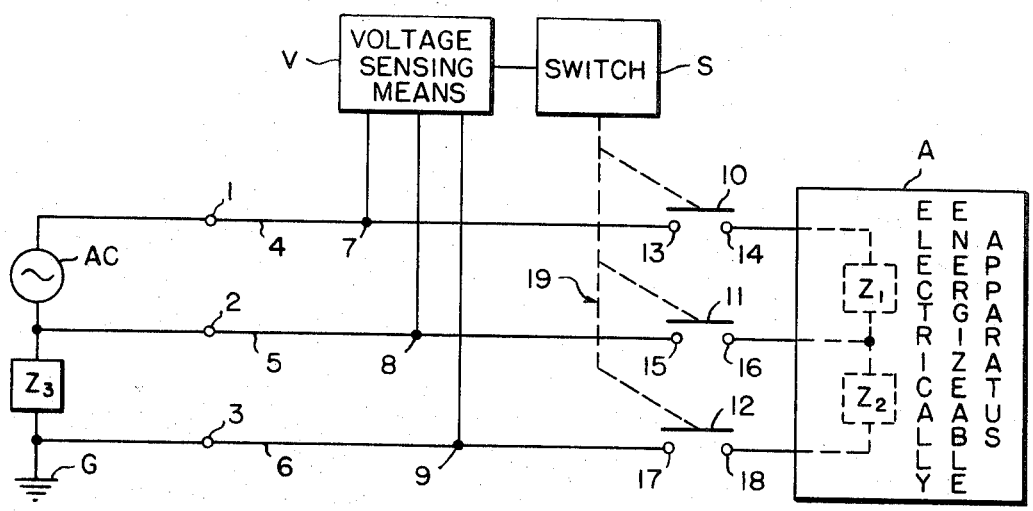
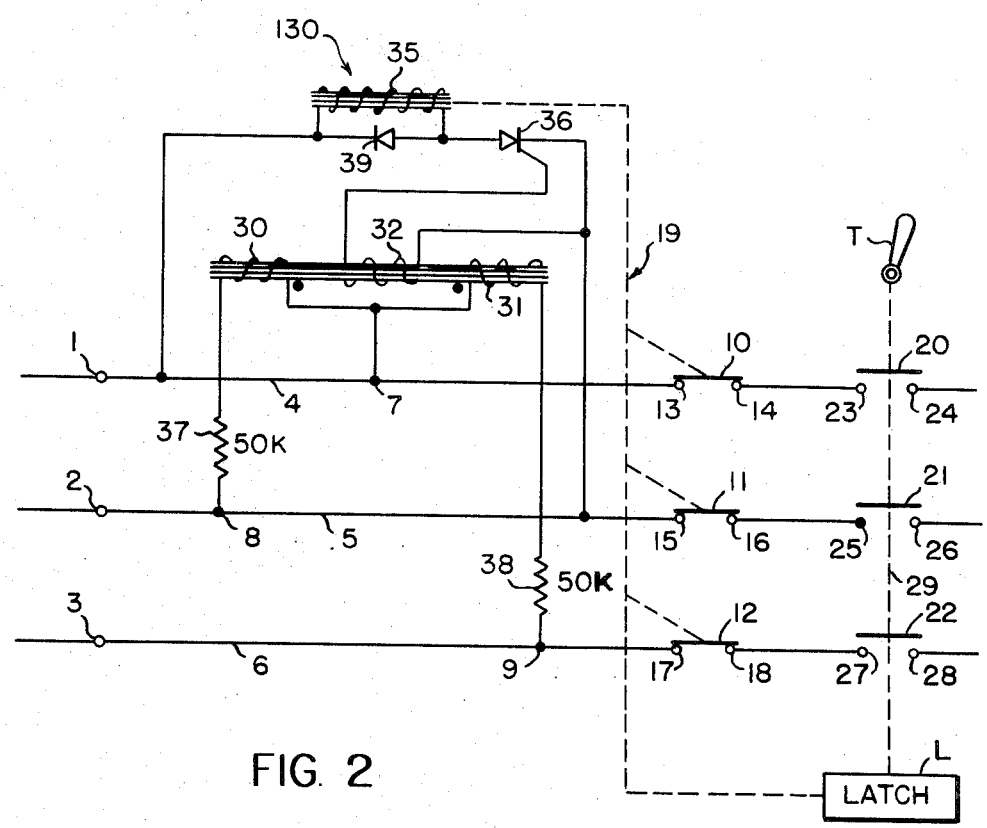
FIG. 2

SAFETY DEVICES FOR ELECTRICAL APPARATUS OF MEDICAL AND OTHER TYPES

BACKGROUND, FIELD OF THE INVENTION

The present invention relates to medical, dental and other apparatus which may contact a living being unsafely due to fault in the connection of the apparatus to the electrical source for energizing the apparatus. For example, such connection may be made by polarized plugs which through wear can be inserted wrongly, so that what is nominally the "hot" conductor connecting the hot side of the electrical source is actually the "neutral" conductor, and vice versa, that is to say, the connections are transposed. Again, there may be discontinuity in a "ground" conductor, for example.

Under various circumstances, these types of connection faults, namely, transposition and discontinuity, may result in leakage currents through a living being contacting the apparatus, and at levels dangerous to that being. In some cases, too, such faults may be harmful to the apparatus.

BACKGROUND, DESCRIPTION OF THE PRIOR ART

There are various well-known expedients for providing safety in using apparatus of the class described. As noted above, for example, polarized plugs are intended to assure proper connections, and a ground conductor is provided.

In addition, the apparatus may be provided with fault sensing means, such as a ground detector, fuse, or the like, which responds to the existence of a fault by disconnecting the apparatus; an isolating transformer may be interposed between electrical source and apparatus, and so forth.

In particular, U.S. Pat. No. 3,628,094, granted Dec. 14, 1971 to J.J. Saeli and myself, discloses a safety device for apparatus in which connection of the apparatus to the energy source is by means of a hot conductor and a neutral conductor, and there is also a ground conductor. The patented safety device includes a differential transformer having a pair of primary windings, one of which is to be energized by the voltage between hot and neutral, the other of which is to be energized by the voltage between hot and ground, and each being wound on separate cores. The transformer also has a secondary winding, and this is so related to the primary windings and cores that unless there is voltage across both primaries, and the voltages are properly related a voltage appears across the secondary.

The safety device is preferably more or less integral part of the apparatus with which it is used. This is because the faults with which the invention deals arise externally of the apparatus, and in its connections to the electrical source which energizes. Typically, there is a three-conductor power cord terminating at one end in the apparatus, and at the other end in a plug having male electrodes. A corresponding plug, having female connectors, provides, with the male connectors, the ground, neutral, and hot terminals of the system. The safety device preferably provides the termination of the power cord at the apparatus, so faults occurring between the apparatus and the energy source will prevent the apparatus from being turned on, if there is a discontinuity or conductor transposition in the connections at any point between source and safety device. Thus, either plug may be incorrectly-wired, they may be joined together in wrong polarity, the ground connection may be broken, and so on, and the safety device will detect this and prevent the apparatus from being manually switched on by the operator of the apparatus.

SUMMARY OF THE INVENTION

Like the aforesaid patent, the present invention relates to a safety device having a differential transformer. However, the safety device according to the invention includes a different form of differential transformer. In particular, the present invention provides a single core transformer having a pair of windings connected to form a center-tapped primary winding, and having a secondary winding. The ends of the primary winding are connected to ground and neutral conductors connecting apparatus to the source of electrical energy, and the center tap is connected to the hot conductor of the apparatus. Between such connections and the apparatus is a normally-closed switch, which if opened, opens each wire. The switch has an operating winding connected between the neutral and hot wires, but via a silicon controlled rectifier (SCR). The secondary winding of the transformer is connected to the gate of the SCR for firing same, should a voltage of the correct polarity appear across the secondary winding. As it happens, no such voltage appears except under fault conditions such as would be dangerous. If such voltage appears, the SCR fires, energizes the operating winding, whereupon the switch opens. As the transformer is a voltage sensing device, appreciable current does not have to flow before the switch opens. The transformer windings are a single core and very little current need flow in producing firing voltage for the SCR, so the transformer's primary, which in use is continuously energized, is connected to ground and neutral via current limiting resistance.

BRIEF DESCRIPTION OF THE DRAWING

FIG. 1 is a schematic diagram of a Safety device in connection with a source of electrical energy and apparatus connected to said source;

FIG. 2 shows a safety device according to the invention having a differential transformer, and so much of FIG. 1 as is necessary to illustrate the operation of the safety device with the transformer.

In FIG. 1, reference numerals 1, 2 and 3 designate the respective hot, neutral and ground terminals at the plug-in or other connection of the respective hot, neutral and ground conductors 7, 8 and 9, by means of which electrically-energizeable apparatus A is to be energized by a source AC of electrical energy.

Voltage sensing means V is connected at points 7, 8 and 9 to conductors 4, 5 and 6, respectively, for controlling a switch S in accordance with the relationship among the voltages at the said points. Switch S has movable contactors 10, 11 and 12 for conductively bridging the electrical discontinuity of the respective fixed-contact pairs 13 and 14, 15 and 16, and 17 and 18. The dashed-line ganging 19 represents mechanism of switch S for moving contactors 10, 11 and 12.

It is to be supposed that the contactors 10, 11 and 12 move in unison. It is to be further supposed that points 7, 8 and 9 and the system of contacts 13 through 18 are structurally integrated as intimately as practical with the portions of apparatus A with which they connect electrically. The first of these portions is represented by impedance Z, representing the electrical load to be driven by source AC, and the second of these portions is represented by impedance $Z_2$, representing that part of the apparatus which is not supposed to be energized. Normally, $Z_2$ will include the leakage impedance, to housing or chassis structure, of electrodes, tools, or the like, for contacting a human being.

It will be observed that the only difference between FIG. 1 hereof and FIG. 1 of the aforesaid patent is that in the latter the emphasis was on the function of the safety device to close contacts of switch 10, if no faults are sensed. That is still an appropriate consideration in the present case, but not a necessary one.

FIG. 2 hereof corresponds to FIG. 2 of the aforesaid patent, and in fact does not differ therefrom except as to the differential transformer. Thus, in FIG. 2 hereof, windings 30 and 31 are on the same core 34, as is the secondary winding 32. The windings 30 and 32 are connected together so as to define a primary winding having a center-tap, which is connected to point 7 on hot conductor 4. As indicated by the dots at the adjacent ends of the windings 30 and 31, they are wound in opposition to each other.

The remaining ends of windings 30 and 31 are connected via resistances 37 and 38, respectively to neutral conductor 5 and ground wire 6.

The operating coil or winding 35 of solenoid 130 is connected across hot conductor 4 and neutral conductor 5 via an SCR 36. Secondary winding 32 is connected from the gate of the cathode of the SCR. Consequently, unless there is induced a sufficiently large and properly polarized voltage across winding 32, the SCR will prevent current flow through coil 35. When SCR 36 conducts, diode 39, across coil 35, provides a path for reverse current when the SCR is in the non-conductive half of the power cycle and provides quiet operation of the relay.

The overall functioning of FIG. 2 hereof is generally as in FIG. 2 of the aforesaid patent, so it will not be necessary to describe the remainder of the Figure here. The basic difference between the two is that the solenoid 130 drew its power from the line via the transformer, in the earlier case, whereas in the present case, the solenoid draws its power directly from the line, under direct control of the SCR 36. Consequently, in the present case, the safety device can use a conventional single core transformer, rather than the rather special (and more bulky) two-core transformer of the patent because the current limiting resistors prevent excessive currents from flowing in the opposing primaries.

The transformer of the patent also had to draw continuously a relatively large current from the line, whereas in the present case, the current limiting resistances 37 and 38, typically 50,000 ohms each, or more, limit the current drawn from the transformer. Only a few hundred microamperes of current at a low voltage suffice to fire the SCR 36, whereas the transformer of the patent has to be able to supply several hundred times as much energy to energize the solenoid 130 properly.

While the SCR is an added element to be taken accound of in considering the reliability of the safety device, the normal failure habit of an SCR is to short its anode/cathode junction, so it is substantially fail safe, because such shorting will open the contacts 10, 11 and 12.

In any event, as long as conductors 5, 6 and 7 are properly connected and energized, the voltage across winding 30 will cancel the voltage across winding 31, and hence there will be substantially zero voltage across winding 32, and therefore SCR 36 will not fire. On the other hand, the voltages across windings 30 and 31 will differ enough that SCR 36 fires when terminal 1 goes positive enough with respect to terminal 12, under the following conditions:
1. Electrical discontinuity in conductor 5.
2. Electrical discontinuity in conductor 6.
3. Interchanged/connections of conductors 4 and 6 to terminals 1 and 2.
4. Interchanged/connections of conductors 4 and 5 to terminals 1 and 2.
5. Interchanged/connections of conductors 5 and 6 to terminals 2 and 3,
if the latter are at different potentials.

The SCR can be replaced by a Triac or other gate-controlled solid state device capable of controlling relatively high current, in response to low gate voltage.

Having described my invention according to the requirements of 35 USC 112, I claim:

1. The combination with an electrically-energizeable apparatus adapted normally to electrically contact a living being safely when said apparatus is electrically-energized and free of fault, of a safety device operatively associated with said apparatus for preventing fault from causing said apparatus to be in unsafe electrical contact with said living being;

said apparatus having a hot conductor, a neutral conductor and a ground conductor, said hot conductor being connected to a first portion of said apparatus and being adapted to connect said first portion to the hot terminal of a source of electrical energy, said neutral conductor being connected to said first portion and being adapted to connect said first portion to the neutral terminal of said source, said ground conductor being adapted to connect a second portion of said apparatus to a ground terminal;

there being means, independent of said apparatus, electrically interconnecting said neutral terminal and said ground terminal, and said apparatus being energizeable in response to the electrical energy of said source available at said terminals;

said safety device including a switch controlling electrical continuity of said hot conductor at a place between the said hot terminal and said first portion; said safety device also including voltage sensing means connected in voltage sensing relation to said conductors at points between said portions, on the one hand, and said terminals, on the other hand;

said voltage sensing means being connected to said switch and being responsive to the several voltages at said points to substantially prevent said switch from being operative to control electrical continuity at said place, under any one of the following conditions:

electrical discontinuity in said neutral conductor; electrical discontinuity in said ground conductor; connecting said hot conductor to said ground terminal and said ground conductor to said hot terminal; connecting said hot conductor to said neutral terminal and said neutral conductor to said hot terminal; connecting said neutral conductor to said ground terminal and said ground conductor to said neutral terminal, provided said neutral and ground terminals are at different potentials;
said voltage sensing means including a core, primary windings on said core, a secondary winding on said core, and first and second current limiting means;
one said primary winding and said first current limiting means being connected in series between said hot conductor and said neutral conductor for producing first flux in said core when there is voltage between said hot conductor and said neutral conductor;
a second said primary winding and said second current limiting means being connected in series between said hot conductor and said ground conductor for producing second flux in said core when there is voltage between said hot conductor and said ground conductor;
said one said primary winding and said second said primary winding being arranged on said core so that the fluxes produced thereby cancel when the voltages on said conductors have the correct relative polarities and magnitudes;
said switch having operating means electrically interconnecting said hot conductor and said neutral conductor, said operating means including an SCR interrupting such electrical interconnection except when said SCR is firing, and there being means electrically connecting the gate of said SCR to said secondary winding, for firing said SCR in response to voltage of the correct polarity and magnitude appearing across said secondary winding.

2. The invention of claim 1, wherein said first current limiting means includes a first resistor having one end connected to said neutral conductor and having its other end connected to said one said primary winding, and said second current limiting means includes a second resistor having one end connected to said ground conductor and its other end connected to said second said primary winding.

3. Switch operating circuitry including, in combination:
a transformer having a core, a primary winding having a center tap, and a secondary winding, said windings being wound on said core, and said primary winding being a first winding and a second winding, each having one end connected to the other and being wound in a sense opposite to that of the other;
an SCR, said SCR having its anode connected to said center tap, its gate connected to one end of said secondary winding, and its cathode connected to the other end of said first winding and to the other end of said secondary winding; and
an operating coil for a switch, said coil being connected in series with the said anode and cathode of said SCR.

4. The switch operating circuitry of claim 3, wherein there is first current limiting means interconnecting said other end of said first winding to said cathode and to said other end of said secondary winding, and there is second current limiting means connected to the other end of said second winding.

5. The switch operating circuitry of claim 4, wherein said first current limiting means is a first resistor, and said second current limiting means is a second resistor.

* * * * *